United States Patent [19]
Valus et al.

[11] Patent Number: 6,083,297
[45] Date of Patent: Jul. 4, 2000

[54] GAS DEHYDRATION MEMBRANE WITH LOW OXYGEN AND NITROGEN PERMEABILITY

[75] Inventors: Ronald J. Valus, Valley View; Randall W. Nichols, Westlake; James C. Davis, Hudson, all of Ohio

[73] Assignee: Whatman, Inc., Mass.

[21] Appl. No.: 08/936,157

[22] Filed: Sep. 24, 1997

Related U.S. Application Data

[63] Continuation of application No. 08/571,385, Dec. 13, 1995, abandoned.

[51] Int. Cl.[7] .......................... B01D 53/22; B01D 53/26
[52] U.S. Cl. ....................... 95/44; 95/52; 96/5; 96/11
[58] Field of Search ......................... 95/44, 45, 52; 96/5, 8, 10, 11

[56] References Cited

U.S. PATENT DOCUMENTS

| | | |
|---|---|---|
| 3,447,286 | 6/1969 | Dounoucos ........................... 95/44 |
| 3,503,186 | 3/1970 | Ward, III ............................. 96/5 X |
| 3,625,734 | 12/1971 | Ward, III ............................. 96/5 X |
| 3,957,559 | 5/1976 | Hoffman, Jr. ....................... 95/48 X |
| 4,239,507 | 12/1980 | Benoit et al. ........................ 95/48 |
| 4,606,740 | 8/1986 | Kulprathipanja .................... 95/47 |
| 4,608,060 | 8/1986 | Kulprathipanja et al. .......... 95/49 X |
| 4,710,205 | 12/1987 | Deetz et al. ......................... 96/5 |
| 4,772,391 | 9/1988 | Baker et al. ......................... 210/490 |
| 4,781,733 | 11/1988 | Babcock et al. ..................... 55/16 |
| 4,851,127 | 7/1989 | Lee et al. ............................. 210/654 |
| 4,853,122 | 8/1989 | McCray ............................... 210/321.89 |
| 4,876,009 | 10/1989 | McCray ............................... 210/500.33 |
| 4,900,448 | 2/1990 | Bonne et al. ......................... 95/44 |
| 4,913,818 | 4/1990 | Van Wijk et al. .................... 95/52 X |
| 4,915,838 | 4/1990 | Bonne et al. ......................... 95/52 X |
| 4,954,145 | 9/1990 | Thakore et al. ...................... 96/5 X |
| 4,973,434 | 11/1990 | Sirkar et al. ......................... 96/5 X |
| 5,108,464 | 4/1992 | Friesen et al. ....................... 95/52 |
| 5,110,326 | 5/1992 | Sirkar et al. ......................... 96/5 |
| 5,135,547 | 8/1992 | Tsou et al. ........................... 95/44 |
| 5,236,474 | 8/1993 | Schofield et al. .................... 95/52 X |
| 5,281,254 | 1/1994 | Birbara et al. ....................... 95/44 |
| 5,399,188 | 3/1995 | Roberts ................................ 95/52 |
| 5,487,774 | 1/1996 | Peterson et al. ..................... 95/45 |

FOREIGN PATENT DOCUMENTS

| | | | |
|---|---|---|---|
| 60-090005 | 5/1985 | Japan .................................. 96/5 |
| 62-191017 | 8/1987 | Japan .................................. 95/52 |
| 3-114509 | 5/1991 | Japan .................................. 96/5 |
| 6-106021 | 4/1994 | Japan .................................. 95/52 |
| WO94/01204 | 1/1994 | WIPO .................................. 95/52 |

*Primary Examiner*—Robert Spitzer
*Attorney, Agent, or Firm*—Fay, Sharpe, Beall, Fagan, Minnich & McKee, LLP

[57] ABSTRACT

The invention relates to a gas dehydration membrane comprising a membrane having pores communicating between a first and an opposing second surface of the membrane and further having an average pore diameter on the first surface of the membrane which is about 10 to 1000 times smaller than that on the opposing second surface of the membrane. The invention further relates to a process for dehydrating a gaseous feedstock comprising passing the gaseous feedstock over a membrane characterized by high surface porosity wherein pore openings on a first surface thereof are at least 10 to 1000 times smaller than pore openings on an opposing surface thereof and wherein from about 2% to about 30% of the pore volume is occupied by a humectant.

9 Claims, 1 Drawing Sheet

GAS DEHYDRATION MEMBRANE WITH LOW OXYGEN AND NITROGEN PERMEABILITY

This is a continuation of application Ser. No. 08/571,385, filed Dec. 13, 1995, now abandoned.

BACKGROUND OF THE INVENTION

This invention relates to a unique combination of membrane morphology and hydrophilic pore additive to enhance performance of gas dehydration membranes.

Known methods of enhancing gas dehydration over conventional membrane materials involve various manners of coating the membrane surface, treating the membrane polymer material, or subjecting the membrane to a reaction process to achieve enhanced dehydration performance.

For example, a suitable membrane may be coated with silicon rubber or oil, or with polyvinylpyrrolidone. The result of coating a membrane with these materials is improvement of water-to-gas selectivity while achieving high water permeability. The drawback to this method, however, is that it requires a second treatment step, which is usually done after module manufacture, and may result in a non-functioning module due to the deposition of a membrane coating which is too thick, or a coating which has been deposited incompletely or non-uniformly.

Another means of enhancing membrane performance is related to the actual membrane composition. In U.S. Pat. No. 4,876,009 a composite reverse osmosis membrane of a microporous polymeric support and a polyamide reaction product of a tetrakis-aminomethyl compound and a polyacylhalide is disclosed. The reaction product is an interfacial polymerization (IFP) reaction product, i.e., a surface treatment product or film formed within the porous membrane. Similar membrane composition and construction is disclosed in U.S. Pat. Nos. 4,853,122; 4,781,733; 4,851,127; and 4,772,391. In each instance, the improved separation capability which is reported is achieved by employing a surface treatment technique which deposits a thin film on the surface of a polymeric support material. Drawbacks to this type of construction or membrane generation method are similar to those noted above.

An additional drawback to the foregoing methods is the high gas permeability of the membranes. This can be a particular problem in the dehydration of a mixed gas, such as air, where product composition may be adversely changed due to different permeation rates of the gases being dehydrated.

No method currently used is able to successfully achieve gas dehydration at an acceptable product rate and yet maintain low gas permeability, while eliminating the coating or IFP steps.

What is needed, therefore, is a membrane which achieves gas dehydration at an acceptable product rate while maintaining low gas permeability.

What is further needed is a membrane which achieves gas dehydration at an acceptable product rate while maintaining low gas permeability and which is easily commercially prepared, without having to undergo post- casting coating or reaction processing.

These and other objects of the subject invention will become readily apparent to the skilled artisan upon reading and understanding the full disclosure which follows.

SUMMARY OF THE INVENTION

The invention relates to a gas dehydration membrane comprising a membrane having pores communicating between a first and an opposing second surface of the membrane and further having an average pore diameter on the first surface of the membrane which is about 10 to 1000 times smaller than that on the opposing second surface of the membrane.

The invention further relates to a process for dehydrating a gaseous feedstock comprising passing the gaseous feedstock over a membrane characterized by high surface porosity wherein pore openings on a first surface thereof are at least 10 to 1000 times smaller than pore openings on an opposing surface thereof and wherein from about 2% to about 30% of the pore volume is occupied by a humectant.

DETAILED DESCRIPTION OF THE PREFERRED EMBODIMENT

The invention relates to the use of a specified group of humectants, or desiccants, in conjunction with membranes having a specific morphology to enhance the performance of the membrane with respect to tile dehydration of water-wet gases. The unique combination of membrane morphology and pore filler described herein is remarkably effective in the dehydration of gases. Further, the membranes which are the subject hereof demonstrate unusually low permanent gas permeability. As used herein, the terms "pore filler", "humectant", and "desiccant" are all interchangeable and suitably describe the material used to fill the pores of the subject membranes.

The membranes are suitable for use in the dehydration of water- wet gases. Among these gases are included compressed air, methane, hydrogen, helium, carbon dioxide, and the like.

Suitable membranes are those commonly referred to as ultrafiltration (UF) membranes, though other membranes may likewise benefit from the principle demonstrated herein with respect to UF membranes. For example, dialysis, nanofiltration (approximately 10 Å pores) and plasmapheresis membranes may be similarly treated to enhance the performance thereof with respect to specified separation processes. Suitability of this inventive concept to these other membranes depends upon the ability of the membranes to imbibe the humectant or humectant solution into the pores of the membrane surface and retain it therein.

The membrane morphology which is critical to the invention is one wherein one membrane surface pore size is much smaller than the opposing membrane surface pore size. Although usable, the type of membrane having uniform pore size throughout will typically demonstrate lower water permeability, thus making it a less desirable membrane morphology. In the subject membrane morphology, the membrane pores, though they are continuous from one surface of the membrane to the opposing surface thereof, follow a tortuous path through the thickness of the membrane. On the skin side of the membrane the pores have an average diameter of about 10 to 200 Angstroms, and on the remaining, large pore size side of the membrane the average pore diameter is about 200 Angstroms to 10 microns. The difference in pore sizes from one surface of the membrane to the other may be, therefore, on the order of about 1000 times and is generally at least about 10 times, preferably between about 10–100 times. The near surface porosity on the small pore side of the membrane is more critical than that on the large pore surface due to the fact that it is in this pore region that the pore filler is retained. The actual pore size range will of course vary from one type of membrane to another, as well as among polymeric materials used to form the membrane.

Figure 1:
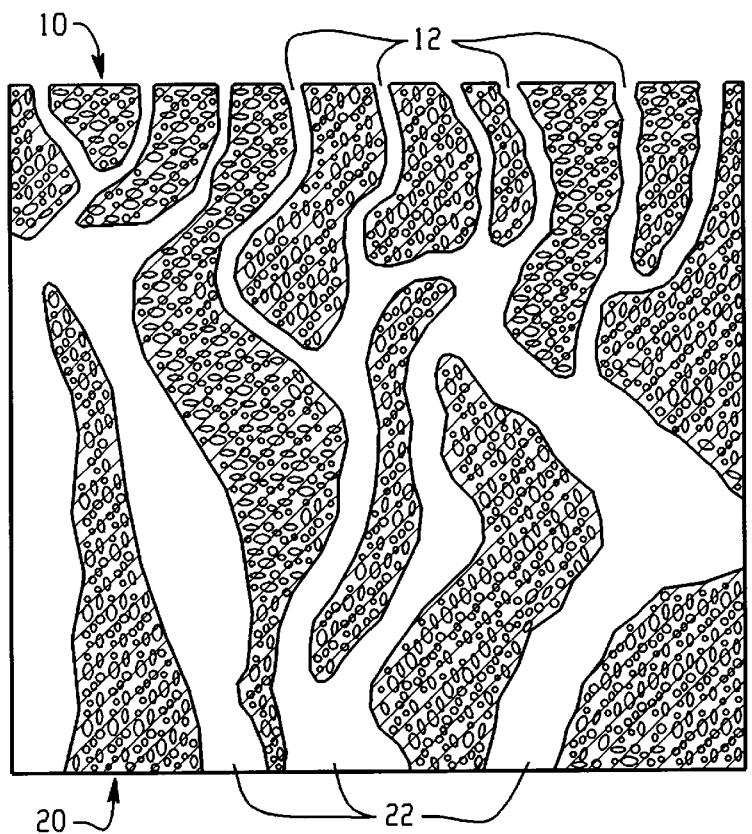
FIG. 1 is a cross-sectional view of a membrane having the morphology described herein; and, FIG. 2 is the membrane of FIG. 1, with pore filler in place.

FIG. 1 depicts a cross-section of a membrane having a morphology in keeping with the subject invention. The upper membrane surface 10 has pores 12. Pore openings 12 on this surface 10 of the membrane are much smaller than the pore openings 22 on the lower, opposing membrane surface 20. As shown, the pores having smaller openings 12 and larger openings 22 are continuous throughout the thickness of the membrane.

Figure 2:
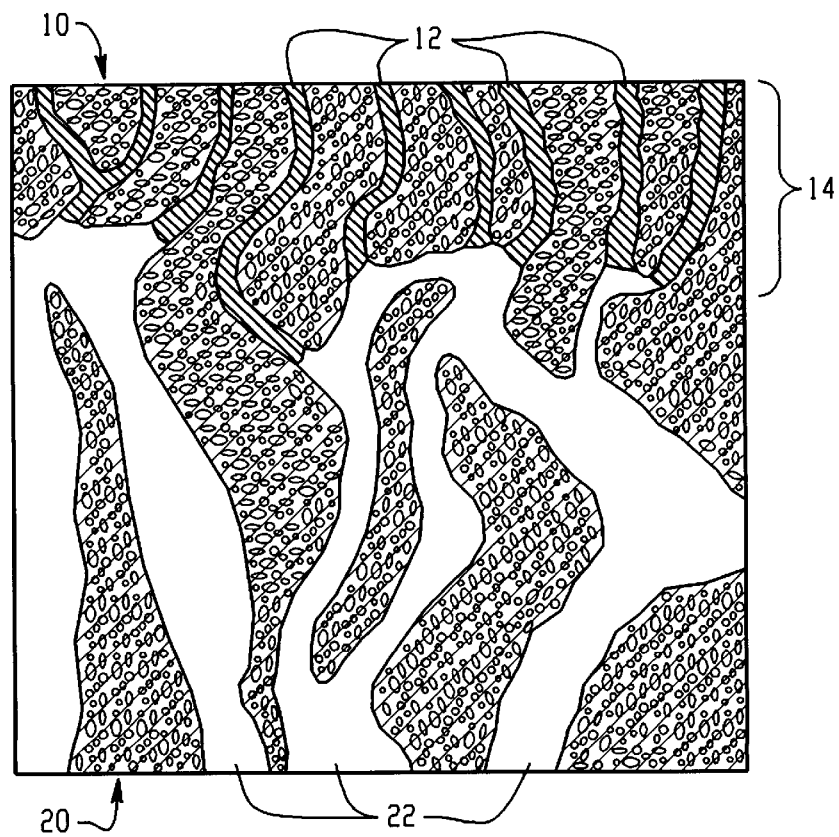

FIG. 2 depicts a cross-sectional view of a membrane having the desired morphology and further showing the inclusion of pore filler material retained within the membrane pores. The pore filler is preferably held in the smaller diameter end of the membrane pores 12 in that portion 14 of the pore which represents about 2–30% pore volume, preferably about 5–15% pore volume. Physical laws governing capillarity dictate that the humectant will migrate to the smallest available pore segment. Nonetheless, it is not critical to the subject invention that the fluid feedstock undergoing separation contact the membrane initially on that side of the membrane having the smaller pores, even though the pore filler, given the foregoing, is likely to be closer to this membrane surface. In fact, the fluid feedstock may contact the membrane at either membrane surface and achieve the same results with respect to membrane performance.

Those materials suitable for use in achieving the desired membrane morphology include those polymeric materials typically known to the skilled artisan for use in making porous membranes exhibiting the specified morphology. Examples of the polymeric materials include polysulfones, polyethersulfones, polyarylsulfones, polycarbonates, nylons, polyimides, polyvinylidenedifluorides, polyvinylidenedichlorides, cellulosics, polyacrylonitriles, and others known to make porous membranes, used alone or in combination. Beyond the use of polymeric materials, inorganic materials capable of forming the appropriate pore structure may also be suitable for use herein, such as ANOPORE® membrane available commercially from the assignee of this invention, Whatman, Inc., which is an anodic aluminum oxide membrane. The desired morphology may be achieved with the suggested materials by a number of processing and formation techniques, among them phase inversion, thermal induced phase separation (TIPS), track-etching, or other known or envisioned means of fabricating porous membranes with appropriate pore diameter. As was stated hereinabove, the resulting membrane is characterized by a surface porosity on the order of 2–70%, a relatively narrow skin or surface pore diameter, and is preferably skinned on one side. By the term "surface porosity" is meant that at least 2% of the membrane surface is pore openings, and preferably at least 10–70% of the membrane surface is pore openings, and most preferable at least 10–40% of the membrane surface is pore openings. The membranes, thus, do not show common features of dense skinned, coated or inter-facially polymerized composite membranes, which generally do not exhibit the porosity of the membranes used herein.

The membrane, once formed, is placed in contact with a pore filler material. These materials are highly hydrophilic in nature and are typically water soluble. Suitable humectants, or desiccants, include glycerine, tetraethylene pentamide, diethyleneglycol, erythritol, xylitol, lithium bromide and other compounds of this nature, either alone or in combination. The pore fillers suggested for use herein demonstrate a unique feature in that they do not, over time, evaporate from the membrane pores as may be expected. It is a standard physical principal that the relative volatility of a given liquid is a function of the pore size of the membrane material. For the humectants suggested as useful in the subject invention, a pore diameter of less than 200 Å generally implies a volatility of essentially zero. Thus, as stated above, the specified pore fillers in combination with the specified membrane result in retention of the filler in the pores of the membrane.

While use of the pore filler material at a level of 100% with respect to percentage of the pore which actually contains filler results in adequate performance, the most efficient use of pore filler with respect to resulting performance is achieved at a level of about 2–30% pore volume, preferably between 5–15% pore volume. At less than 2% pore volume it has been observed that the filler has a greater tendency to only partially fill the pore than it does at higher levels. Incomplete filling of the smaller end of the pore will lead to opening of the pore to bulk gas flow, thus reducing overall membrane performance. At greater than 15% pore volume, the diffusion path for separation purposes may become too long for commercial application. Therefore, while separation performance is excellent, the overall flux may be too low to be of practical use. The optimum percent pore volume will vary among suitable pore fillers and the membrane with which the filler is combined for use in performing separation processes.

The pore filler is loaded or charged to the pores of the membrane by contacting a filler-in-water solution with the membrane, removing the excess solution, and drying the membrane. Alternatively, the neat liquid pore filler may be contacted with the membrane, the excess removed and the membrane dried. Once the pore filler material has been incorporated into the membrane and the membrane has been dried, it is ready for use. No additional surface treatment is required. It is to be understood that the pore filler may be loaded into the membrane pores prior to module fabrication or in situ.

The following Examples set forth in more exact detail the parameters of the invention with respect to specified membrane-pore filler combinations. It will be appreciated by the skilled artisan that the various limitations recited may change with the use of different membrane-filler combinations. Thus, the Examples are provided merely for purposes of illustration and are not intended to be limiting to the subject invention in any way.

The following Table I sets forth the dehydration capability of various membrane-pore filler combinations. In each Example, the membrane was prepared according to the following regimen. A polysulfone hollow fiber membrane made of Amoco Udel P1835 polysulfone (30.4%), GAF K-30 Polyvinylpyrrolidone (10.1%) and BASF N-methylpyrrolidone (59.5%), was spun to 420 micron outside diameter and 290 micron inner diameter using equipment and techniques known to those knowledgeable in the art. The as-spun fibers were drained, treated with the specified humectant, and air dried. Once dried, the fibers were assembled into modules having 7ft$^2$ area, and operating on boreside feed pressure of 100psig and feed of 1.25scfm, with a low pressure side counter current sweep generated by redirecting a portion of the dry product gas back into the module. The units were tested by feeding the specified quantity of humidified air (17° C. dew point)

taking the specified percent sweep, and allowing the system to come to a stable dew point over a minimum of two hours. A General Eastern Model HYGRO-M1 dew point meter was used for the measurements. Rotometers or dry gas meters were used to measure gas flows. All modules of a given designation had the same amount of membrane as the other modules within 3%.

TABLE I

Pore Filler Performance in Gas Dehydration

| Example | Pore Filler* | Performance Pressure Dew Point ° C. |
|---|---|---|
| 1 | Glycerin - 15% | −29 |
| 2 | LiBr - 5% Glycerin - 10% | −13 |
| 3 | LiBr - 5% Glycerin - 15% | −29 |
| 4 | K17 PVP 5%** | −6 |
| 5 | LiBr - 26% | −31 |
| 6 | LiBr - 5% | −17 |
| 7 | Tetraethylene pentaamine - 15% | −6 |
| 8 | None used | +4.5 |
| 9 | Glycerin - 15% | −27 |
| 10 | Erythritol - 15% | −4 |
| 11 | Xylitol - 15% | −10 |
| 12 | Glycerin - 30 % | −21 |
| 13 | Xylitol - 10% Glycerin - 10% | −22 |
| 14 | Glycerin - 10% | −30 |
| 15 | Glycerin - 10% | −14 |
| 16 | Glycerin - 10% | −26 |

*aqueous solution
**BASF Polyvinylpyrrolidone

The membranes used in Examples 1–7 were all identically prepared the only difference between these examples being the choice of humectant, or pore filler, and the percent solution of each used. In Example 8 no pore filler was employed. A comparison between the Pressure Dew Point data for the examples clearly demonstrates the enhanced performance of the use of the pore filler over that of a membrane lacking the suggested pore filler.

Examples 9–13 represent modules having less membrane area, i.e., 80 cm$^2$ as compared to the 7ft$^2$ area of the modules of Examples 1–8. In these modules, due to the smaller area, the feed flow was 556 cc/min (STP), which is prorata for the area. The performance data illustrates no change from the performance level demonstrated by the modules of Examples 1–7, thus indicating that module size has no appreciable affect on the subject inventive membrane design. Compare specifically the performance data of Examples 1 and 9 which is very similar for the same humectant used at the same pore volume.

In Examples 14–16, the membrane used was identical in all respects, but the module design varied and the modules contained 33 ft$^2$ of membrane area. In Example 14, the module had shell side feed and a product tube at one end of the module for withdrawing a product, i.e., dried gas, from the module. In Example 15, a core tube was used to inject feedstock into the module in a shellside flow manner. Product was collected through a shell port. The Example 16 module had bore side feed. All modules experienced counter current sweep flow generated by redirecting a portion of the product back into the module. These Examples 14–16 demonstrate that initial contacting of either side of the membrane with the fluid feedstock has no appreciable affect on the performance of a membrane formulated according to the subject invention.

Further, other base membrane formulations, based upon the same polymers, give similar results as long as pore-formers such as PVP are used to promote porosity. Porosity is defined as an ultrafiltration molecular weight cutoff using spherical dextrans, which give a cutoff of from 2,000 to 2,000,000. Above that range, higher pressures will blow the humectant out of the fiber pores at an unacceptably low transmembrane pressure. Below that range, the porosity is generally too low to give acceptable flux.

The foregoing disclosure clearly sets forth the performance advantage gained by using a separation membrane having the specified morphology and including the suggested pore filler, as opposed to the use of known surface treatment techniques. The full breadth of the invention has been set forth herein, and further in the claims appended hereto, including all obvious extensions and permutations thereof.

We claim:

1. A process for dehydrating a gaseous feedstock comprising passing the gaseous feedstock at elevated pressure of from about 75 psig to about 125 psig over a hydrophobic membrane characterized by a surface porosity wherein pore openings on a first surface thereof are at least 10 to 1000 times smaller than pore openings on an opposing surface thereof and wherein from about 2% to about 30% of the pore volume is occupied by an aqueous humectant which is substantially free of any carrier and which consists essentially of an aqueous solvent and an humectant selected from the group consisting of glycerine and glycerine in combination with at least one of tetraethylene pentamide, diethyleneglycol, erythritol, xylitol, and lithium bromide.

2. The process of claim 1 wherein the feedstock initially contacts the first surface of the membrane.

3. The process of claim 1 wherein the feedstock initially contacts the opposing surface of the membrane.

4. The process of claim 1 wherein the pressure dew poet of the product gas is at least about 15° C. lower than the pressure dew point of the feed.

5. A gas dehydration membrane comprising a hydrophobic membrane having pores containing an aqueous humectant wherein said pores communicate between a first surface and an opposing second surface of the membrane, the first surface having an average pore diameter of from about 10 to about 200 Angstroms and the second surface having an average pore diameter of from about 10 to about 1000 times larger than that on the first surface of the membrane, and wherein the aqueous humectant occupies from about 2% to about 30% of the volume of any given pore, and consists essentially of an aqueous solvent and an humectant selected from the group consisting of glycerine and glycerine in combination with at least one of tetraethylene pentamide, diethyleneglycol, erythritol, xylitol, and lithium bromide.

6. The membrane of claim 5 wherein the membrane comprises an inorganic material capable of forming a membrane configuration having pores, the diameter of which increases between the first and the opposing second surface of the membrane.

7. The membrane of claim 5 wherein the membrane comprises a polymeric material capable of forming a membrane configuration having pores, the diameter of which increases between the first and the opposing second surface of the membrane.

8. The membrane of claim 7 wherein the membrane comprises at least one polymeric material selected from the group consisting of polysulfones, polyarylsulfones, polyvinylidenedifluorides, and polyvinylidenedichlorides.

9. A gas dehydration membrane comprising a hydrophobic hollow fiber polymeric membrane with a surface porosity of from about 10% to about 40% and wherein the pores on a first side of the membrane are at least 10 to 1000 times smaller than the pores on an opposing surface of said membrane, each of said pores containing glycerine pore filler and humectant at a pore volume of about 2% to about 30%, said membrane exhibiting low gas permeability.

* * * * *